(12) United States Patent
Helpap

(10) Patent No.: US 6,193,236 B1
(45) Date of Patent: Feb. 27, 2001

(54) PACKING SEAL HAVING AT LEAST TWO AXIALLY ADJACENT SEGMENT RINGS

(76) Inventor: Hans Helpap, Ludwigstrasse 26, D-85652 Pliening (DE)

( * ) Notice: Subject to any disclaimer, the term of this patent is extended or adjusted under 35 U.S.C. 154(b) by 0 days.

(21) Appl. No.: 09/240,624

(22) Filed: Feb. 1, 1999

Related U.S. Application Data

(63) Continuation of application No. PCT/EP97/04154, filed on Jul. 30, 1997.

(30) Foreign Application Priority Data

Jul. 30, 1996 (DE) .................................................. 196 30745

(51) Int. Cl.[7] ..................................... F16J 9/18; F16J 9/26
(52) U.S. Cl. ........................... 277/435; 277/446; 277/489; 277/493; 277/494
(58) Field of Search ..................................... 277/435, 446, 277/489, 493, 494

(56) References Cited

U.S. PATENT DOCUMENTS

| | | | |
|---|---|---|---|
| 1,525,428 | * | 2/1925 | Pally . |
| 2,860,018 | * | 11/1958 | Doperalski et al. . |
| 2,885,249 | * | 5/1959 | Payne . |
| 3,203,705 | * | 8/1965 | Doperalski . |
| 3,991,455 | * | 11/1976 | Bergeron . |
| 4,986,168 | * | 1/1991 | Geffroy et al. . |

FOREIGN PATENT DOCUMENTS

| | | | |
|---|---|---|---|
| 249945 | * | 4/1926 | (GB) . |
| 375259 | * | 7/1932 | (GB) . |
| 95/14184 | * | 5/1995 | (WO) . |

* cited by examiner

*Primary Examiner*—Anthony Knight
*Assistant Examiner*—John L. Beres
(74) *Attorney, Agent, or Firm*—Kubovcik & Kubovcik

(57) ABSTRACT

A packing seal is provided which is intended in particular for reciprocating piston engines and which can be placed into a circumferential groove of a piston of such a reciprocating piston engine. The packing seal includes a first segment ring (1), which has at least two sealing segments (3) and locking segments (4) arranged between them in alternating order. These locking segments (4) and sealing segments (3) taper wedge-shaped in opposite directions radially inward and outward, respectively. In addition, the packing seal includes at least one additional or second segment ring (20) which also has at least two sealing segments (23) and locking segments (24) arranged between them in alternating order. The sealing segments (23) and locking segments (24) both taper radially inward in this case. The locking segments (24) extend over a larger arc area than the sealing segments (23). The sealing segments (23) of this second segment ring (20) overlay the locking segments (4) of the aforementioned, axially adjacent first segment ring (1). To prevent a detachment of the sealing arrangement of the packing seal (10') during operation due to rocking motion, a securing device (40) can be provided that delimits in the axial direction a gap present between the packing seal (10') and the groove (31) and preferably reduces this gap depending on working pressure. This securing device (40) can at the same time also decrease the radially directed, effective pressure on the packing seal in the groove base (33).

14 Claims, 3 Drawing Sheets

Fig. 2                PRIOR ART

PACKING SEAL HAVING AT LEAST TWO AXIALLY ADJACENT SEGMENT RINGS

CROSS REFERENCE TO RELATED APPLICATION

This application is a continuation of international application PCT/EP97/04154 filed Jul. 30, 1997.

BACKGROUND OF THE INVENTION

1. Field of the Invention

The invention relates to a packing seal which is intended in particular for reciprocating piston engines and which is preferably placed into a circumferential groove of a piston of such a reciprocating piston engine.

2. Description of Related Art

With reference to FIG. 2 of the attached drawings, a seal in the form of a packing seal is shown which is known from WO 95/14184. The packing seal marked 10 overall comprises at least two axially adjacent segment rings 1, which each have several sealing segments 3 and also many locking segments 4. The sealing segments 3 and the locking segments 4 taper in this case in a wedge-shape in opposite directions radially inward and outward, respectively, in both segment rings 1. These segments are provided inside each segment ring 1 in alternating order. The sealing elements 3 of the at least two segment rings overlap alternately and, by means of at least one spring element 2, such as a bearing spring washer, they are prestressed radially outward against a cylindrical wall—not shown—of a reciprocating piston engine, for example. Provided between the at least two segment rings 1 is a torsion protection formed by a bore 8 and an adjusting pin 9. The bores 8 penetrate two overlapping sealing segments 3 of the two axially adjacent segment rings 1. The torsion protection formed in connection with the two bores 8 and the adjusting pin 9 ensures that the provided reciprocal overlapping of the sealing segments 3 is maintained. So with this known packing seal, there must be a spring element 2, such as a bearing spring washer, which is responsible for the flawless functioning of the seal designed as packing seal. This spring element must exert a predetermined elastic force, directed in predetermined manner, throughout the useful life of the seal, although the spring element is exposed to high and also changing temperatures. Furthermore, the elastic force must be great enough that even under the action of high ignition and/or combustion pressures, the locking parts of the segment ring directly under pressure will not be pressed out of the overall arrangement. Thus, it has been shown that such a spring element must be designed relatively thick, in such a way that considerable groove depths are needed to receive the entire packing seal. Such considerable groove depths may lead to vibration problems that become noticeable as fluttering. This occurs in particular with high-speed, powerful engines, e.g. racing engines, and is attributable to resonance effects. In particular, with the aforementioned known seal it has been shown that the spring element necessary for operation entails not only an expense with respect to production, but in particular extensive changes are also necessary with a view to receiving the packing seal, and such a spring element impairs the functioning of the seal to the effect that when the readjusting rate of the spring element is reduced, changing energy generation and impact make possible—if only in the short-term—an undesired, increased passage of gas, which is also designated as "blow-by". Of course, a loss of power is inevitably connected with this.

On the other hand, the invention aims to provide a packing seal of the generic kind—overcoming the aforementioned difficulties—which ensures, with a simplified assembly and reliability of use, an arrangement of the sealing segments of the packing seal.

BRIEF SUMMARY OF THE INVENTION

According to the invention, for this object a packing seal is provided that has at least two axially adjacent segment rings that each have at least two sealing segments and, to avoid an abutting of the sealing segments, have locking segments arranged between them in alternating order, whereby the sealing segments and the locking segments of at least a first segment ring taper wedge-shaped in opposite directions radially inward and outward, respectively, and the locking segments are set back radially relative to the sealing area of the sealing segments, and the packing seal furthermore has a torsion protection acting between the at least two segment rings, whereby the packing seal distinguishes itself in that the alternating locking and sealing segments of the at least one additional segment ring both taper radially inward, the locking segments extend over a substantially larger arc area than the sealing segments, and that the sealing segments of this additional segment ring overlay only the lock elements of the axially adjacent first segment ring of the packing seal.

In the packing seal according to the invention, a spring element acting as bearing spring can thus be dispensed with, in such a way that the possible impairments—previously existing in this connection—of the known packing seal can be effectively eliminated. Production of the packing seal and assembly thereof is also thereby simplified, because no additional part is needed, such as the bearing spring necessary for operation. In the packing seal according to the invention, this closing function of the seal limits, as well as a reliable arrangement of the sealing segments on the related sealing counter-surfaces, is taken over by the novel design of the at least one additional segment ring. With this additional segment ring, unlike the typical design described in the beginning, the design is made such that the alternately arranged sealing segments and locking segments do not taper in opposite directions, but rather both taper radially inward.

Furthermore, since the respective locking segment of this additional segment ring extends over a larger arc area than the related sealing segments, working pressure of this additional segment ring always reliably results in effective force conditions such that the sealing segments are reliably pressed toward the seal limit to be closed, in such a way that in any operating status and working condition, the sealing segments of the additional segment ring—essential according to the invention—move reliably, necessarily and automatically in the direction of the counter-surface, and in this direction they come under a force of pressure to produce the bearing pressure against the counter-surface.

Furthermore, since the respective sealing segments of the additional segment ring under pressure cover the respective locking segments of the axially adjacent first segment ring, the pressure in the groove base of the groove intended for insertion of the packing seal is sufficient to affect the locking segments of the first segment ring with the effective direction outward in such a way that the segment ring bond of this first segment ring is maintained. This ensures a reliable cooperation of the at least two segment rings in such a way that only dependent upon the respective operating pressure or working pressure, the sealing segments of the at least two axially adjacent segment rings are reliably and immediately brought to rest against the counter-surface under the action of a bearing pressure in such a way that the seal limits are reliably closed and a passage of gas is efficiently prevented.

As can be seen from the preceding explanations, the present invention, even while reducing the construction expense and reducing the number of parts of the packing seal, thus creates an effective remedy for the possible problems of an increased passage of gas, that is, a so-called blow-by. The packing seal according to the invention thus prevents a breaking open of the seal limits at the segment rings, while making use of the working pressures present when the machine is in operating status, in such a way that the procedure of arrangement of the sealing segments is carried out automatically by the working pressure in the manner desired at any given time, reliably and without auxiliary means. This is surprisingly possible in that the taper direction of the locking segments and the sealing segments of the additional segment ring essential according to the invention is selected parallel on the one hand, and on the other hand, that it is directed radially inward, toward the piston axis, for example.

Through this arrangement, in a predetermined angle range, contact surfaces or slide surfaces between the abutting locking segments and sealing segments of this additional segment ring are provided which allow a wedge-shaped extension radially outward for the respective locking segment as well as for the respective sealing segment without a danger of clamping at these contact or slide surfaces. Since the locking segment extends over a larger arc area than the sealing segments, the respective locking segment has a larger partial surface under pressure than the respective sealing segment, whereby the movement of the respective sealing segments toward the counter-surface is not only made possible, but there is also a resulting effective force that presses the respective sealing segments against the corresponding counter-surface with a predetermined contact pressure to obtain a tight closure, whereby this resulting effective force is dependent on the arc area conditions of locking segments and sealing segments for the additional segment ring essential according to the invention. But since, dependent upon the dividing of the first segment ring, usually a relatively small arc area for the sealing segments of the additional segment ring is sufficient that the locking segments of the first segment ring are reliably covered, the arc area of the respective locking segments of the additional segment ring can be selected relatively large, such that a sufficient resulting effective force is produced for the pressing of the sealing segments against the counter-surface.

In the packing seal with the aforementioned construction, the torsion protection is designed in such a way that it produces an interaction bond with at least one locking part segment of the additional segment ring and one sealing segment of the first segment ring. The torsion protection preferably comprises an adjusting element such as an adjusting pin which runs through a bore in the locking segment of the additional segment ring and works together with a recess on the sealing segment of the axially adjacent first segment ring. Such a torsion protection ensures that the at least two axially adjacent segment rings of the packing seal according to the invention remain in the respective predetermined position, in such a way that a relative motion of the at least two segment rings toward each other is effectively avoided. Due to the detached seal limits present in the packing seal according to the invention, a fluttering of the packing seal is thus prevented. In the sealing segment of the first segment ring, the recess of the torsion protection preferably originates from the segment ring's inner circumference, in such a way that an unhindered movement of the sealing segments of the first segment ring radially outward is ensured.

According to a preferred form of construction, each segment ring comprises four locking segments and four sealing segments and in such a form of construction, the taper angle of the segments of the additional segment ring essential according to the invention is roughly 45°. In this way, one obtains a reliably working design of the packing seal, which can be inexpensively manufactured and produced. Of course, the invention is not limited to this preferred number of segment rings and locking segments but rather this number also depends on the dimensions and the sizes of the respective segment rings.

According to a preferred form of construction, at least one securing device for the bond of the packing seal is provided which limits in particular a motion of the segment rings of the packing seal in the axial direction. Determined by heat and assembly, between the inserted packing seal and the radial surface of the assigned groove there is inevitably an intermediate space/gap in the piston. Since frictional forces are exerted on the sealing segments of the segment rings when they are resting against the counter-surface, such as the cylinder wall, due to the existing axial clearance or gap there is a danger that the sealing segments of the respective segment rings may tilt due to the forces acting on them. There is thereby a danger that the sealing arrangement of the packing seal may come apart during operation.

With the help of the securing device provided according to the invention, the axial mobility of the packing seal when installed is limited, namely preferably in that the axial path available for such a tipping motion is made as small as possible. The securing device is in this case preferably designed in such a way that it seeks to decrease particularly in axial direction, and dependent upon working pressure, the assembly gap required for inserting the packing seal. In particular, the securing device comprises at least one element movable radially relative to the packing seal. Its form is largely optional, but it has been shown that favorable conditions are obtained in particular when the securing device is designed wedge-shaped in the direction of the piston axis. With such an arrangement, the possibility to move the packing seal in radial and/or axial direction is limited and restricted, namely in such a way that dependent upon the working pressure acting also on the securing device, the securing device is moved more or less radially with respect to the inserted packing seal.

In order to make use of this axial motion-limiting effect to its full extent, the securing device can preferably be designed annularly and can be subdivided into segments if necessary.

In order to keep the contact pressure of the securing device acting on the packing seal as slight as possible, the securing device's support surface facing the packing seal is reduced for axially directed relief from pressure. For this, this support surface can have surface interruptions such as recesses, relief grooves or the like. The choice of these pressure relief devices depends in particular on the construction of the securing device, such that in this regard, it can only be generally recommended to reduce this axially acting contact pressure on the packing seal as far as possible without impairing the functioning of the packing seal.

Furthermore, in the arrangement according to the invention, the securing device at the same time has another function, consisting of reducing the radially directed effective pressure on the packing seal in the groove base. This can reduce the contact pressures with which the sealing segments of the segment rings, for example, are pressed against the cylinder wall for sealing, thereby not only reducing wear, but also resulting in reduced frictional loss at the sealing areas, in turn making higher performance values obtainable.

It has proven particularly useful that the securing device reduces the flow cross-section to the groove base, in such a way that through structural measures, pressure buildup in the groove base can be influenced and predetermined, to ensure a reliable, long-term functioning of the packing seal.

Thus, with the help of the securing device preferably provided according to the invention, on the one hand an undesired tipping of the segments of the segment rings or an undesired motion thereof in axial direction can be, if not prevented, considerably limited such that in stable and reliable manner the sealing arrangement of the packing seal is maintained in all operating statuses. In addition, using such a securing device, a performance-increasing arrangement can then be achieved if, using this securing device constructively, one affects the flow cross-section on the securing device to the groove base, namely in such a way that not only a pressure relief axially toward the packing seal is achieved, but also the pressure buildup in the groove base is influenced in such a way that there is sufficient impact to move the sealing segments of the segment rings axially with outward effect, but the complete working pressure in the working space is not used for this, but rather the resulting pressure effective in the groove base is reduced in predetermined manner, in order to substantially reduce frictional loss.

In particular the packing seal according to the invention is designed in such a way that thanks to the additional segment ring, the functional ability of the packing seal is largely independent of temperature and pressure conditions and thus also secured from changing temperature conditions.

BRIEF DESCRIPTION OF THE DRAWINGS

Below, referring to the attached drawing, a preferred form of construction according to the invention is explained in more detail. The drawings show.

DETAILED DESCRIPTION

Figure 1:
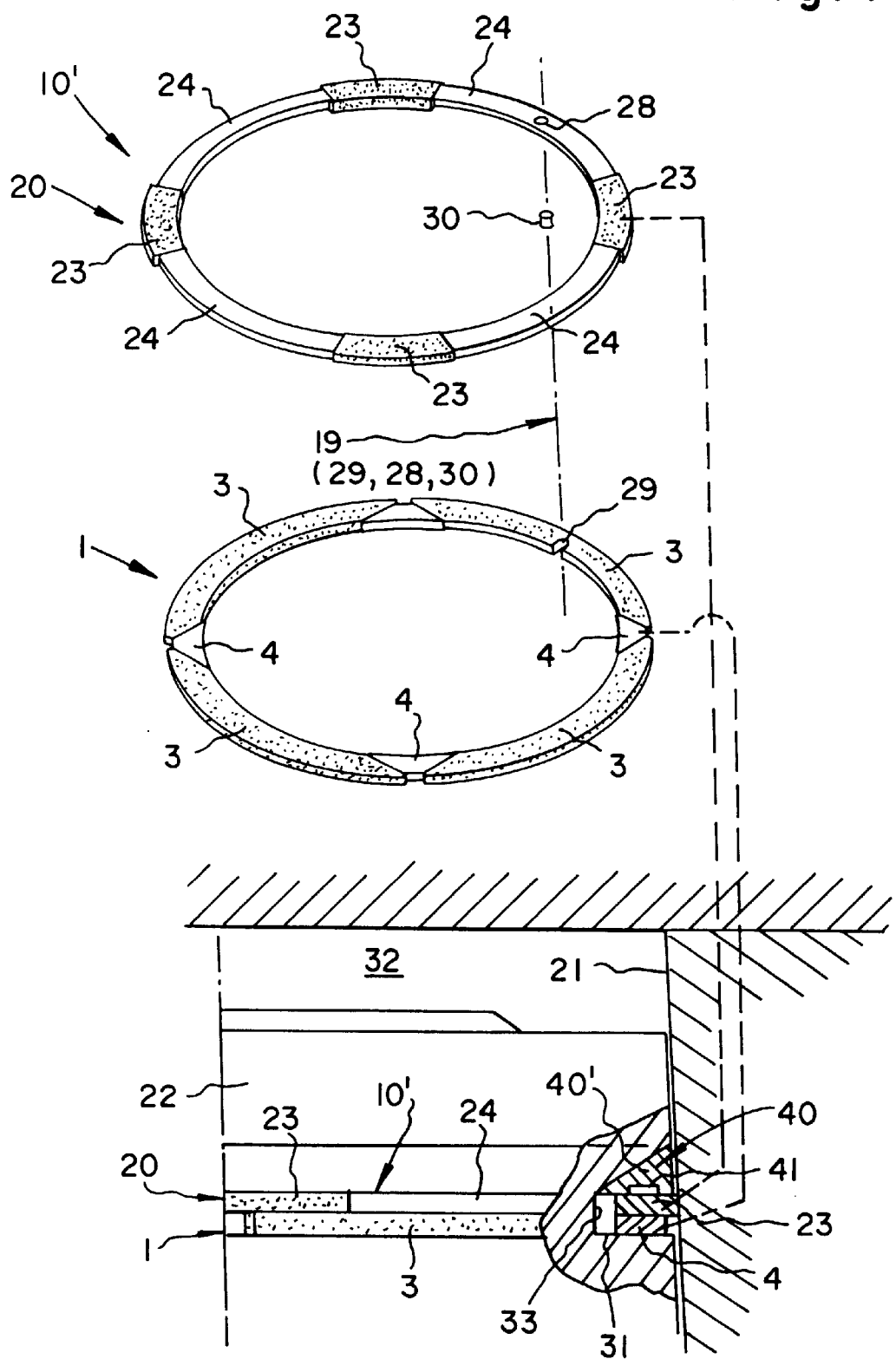
FIG. 1 a combined, drawn out illustration of the segment rings of the packing seal in exploded view correlated with an installation example, and FIG. 2 a packing seal with typical design which was considered the closest state of the art in the beginning.
Figure 2:
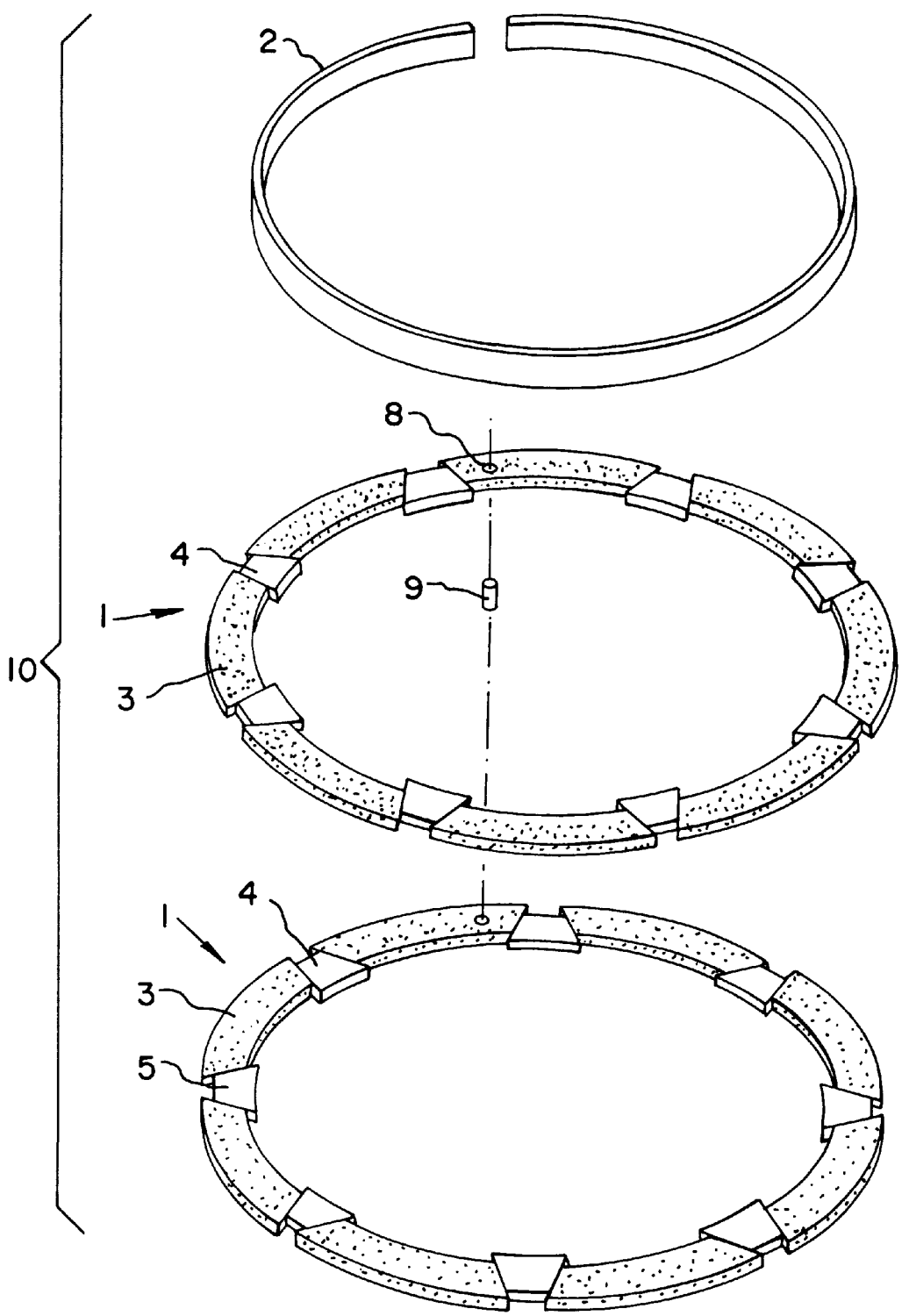

The same or similar parts of the packing seal shown in FIG. 2 are also marked with the same reference numbers in FIG. 1. This applies in particular to the first segment ring 1, which comprises alternating sealing segments 3 and locking segments 4, that taper wedge-shaped in opposite directions radially inward and outward, respectively. In the example shown in FIG. 1, the sealing segments 3 taper radially inward and the locking segments radially outward.

The packing seal 10' according to FIG. 1, essential according to the invention, comprises at least one additional segment ring 20, which has sealing segments 23 and locking segments 24 in alternating order. The locking segments 24 are arranged set back radially inward from the periphery of the sealing segments 23. In this way, a touching of the locking segments 24 against a counter-surface to be sealed is avoided. This counter-surface is formed according to the assembly example in the lower illustration in FIG. 1 by a cylinder wall 21 of a piston not shown in more detail. The locking segments 24 extend over a larger arc area than the sealing segments 23. The arc area of the locking segments 24 is essentially predetermined in that the arc area of the respective sealing segments 23 must be selected in such a way that for the axially adjacent segment ring 1, its locking segments 4 are reliably covered. Based on the piston axis 22 shown as an example in FIG. 1, the sealing segments 23 and the locking segments 24 taper in the same direction, namely radially inward. In this way, between the respective sealing segments 23 and locking segments 24, contact surfaces or slide surfaces are formed that expand wedge-shaped radially outward.

A torsion protection is marked 19 overall. It comprises a bore 28 in a locking segment 24 of the segment ring 20 and a recess 29 in the axially adjacent segment ring 1, namely in a sealing segment 3 thereof, and an adjusting element, such as an adjusting pin 30, which runs through the bore 28 and engages the recess 29 in the sealing segment 3 of the segment ring 1. The recess 29 originates from the inner peripheral surface of the sealing segment 3 of the segment ring 1. With this torsion protection 19, the position coordination of the two segment rings 1 and 20 shown as examples is maintained in the installed condition.

Figure 3:
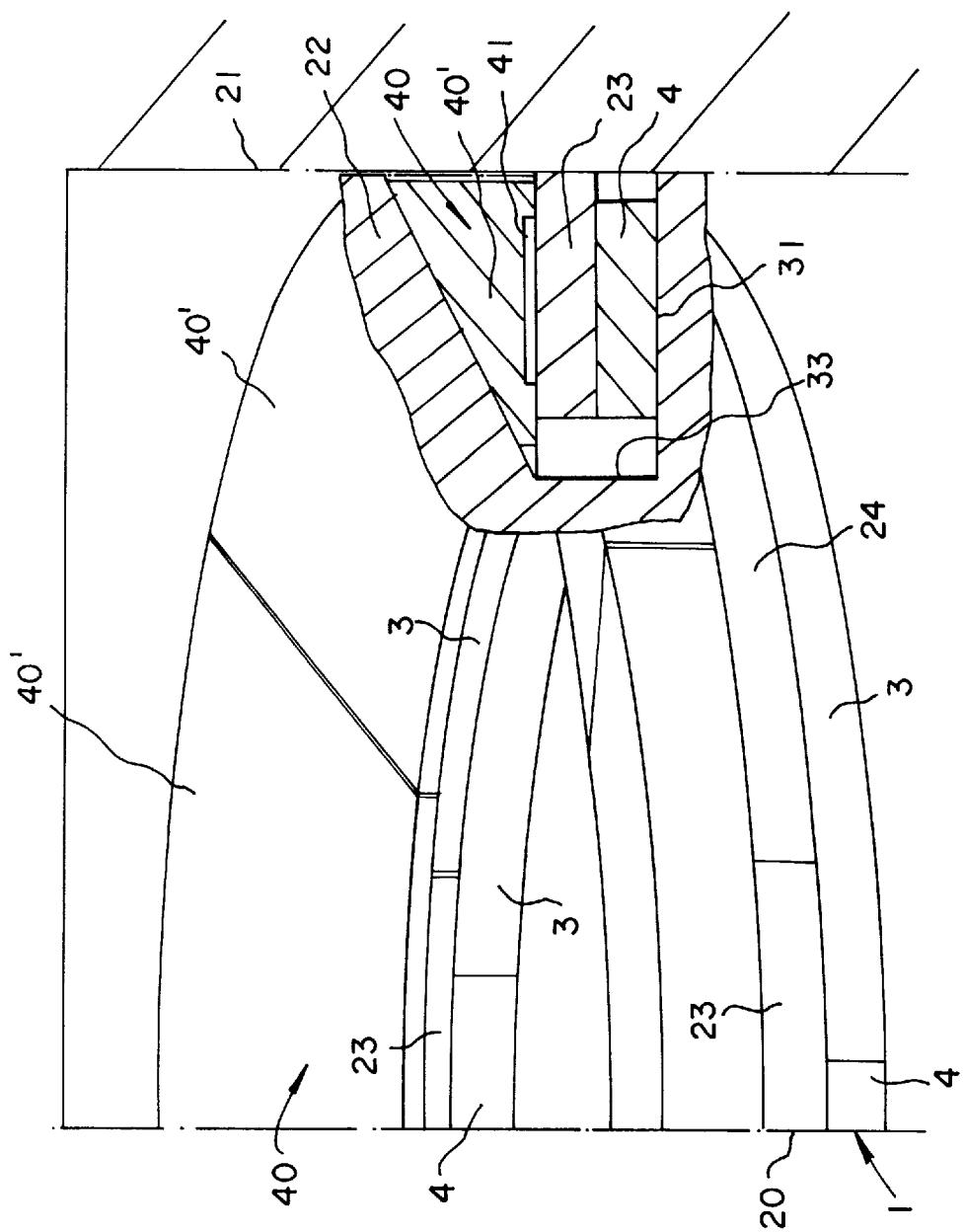
FIG. 3 an enlarged view of the cut away portion on the bottom of FIG. 1, which shows that the securing device 40 is a ring-like shape.

In the lower half in FIG. 1, and FIG. 3 an application is described as installation example for a packing seal 10' according to the invention. In this application, the packing seal 10' is inserted into a circumferential groove 31 of a piston 22. The piston 22 makes a back and forth motion in a working space 32, whereby the working space 32 is limited by the cylinder wall 21, across from which a closing off is to be carried out by means of the packing seal 10' according to the invention. The groove base of the circumferential groove 31 is marked 33. This shows that the packing seal 10' is inserted with inserted torsion protection 19 into this circumferential groove 31 in such a way that there is an intermediate space between the groove base 33 and the inside of the segment rings 1 and 20. During the working motion of the piston 22, different pressures are produced in the working space 32 which are also slightly present in the groove base 33 due to losses. The design of the segment ring 20 makes it possible for its sealing segments 23, supported by the locking segments 24, to be reliably brought to rest against the cylinder wall 21 with a corresponding bearing pressure by the locking segments 24, in such a way that the working space 32 is reliably sealed. Since the two segment rings 1 and 20 have detached seal limits, the large-surface sealing segments 3 of the segment ring 1 are also securely brought to rest against the counter-surface, and arranged in such a way that the detached seal limits formed between the two segment rings 1 and 20 are also reliably sealed, in such a way that an increased passage of gas, so-called blow-by, is prevented in a reliable manner.

As can be seen from the installation example shown at the bottom in FIG. 1 and FIG. 3 and in broken line also, a securing device marked 40 overall can be provided which maintains the bond of the packing seal 10' and in particular limits an axial motion of the segment rings 1, 20 of the packing seal 10'. Since, for reasons of assembly and taking into consideration heat expansion during operation, an axial assembly gap or intermediate space that results between the inserted packing seal 10' and the corresponding wall of the circumferential groove 31 is unavoidable, forces of gravity and frictional forces of the sealing segments 3 and 23 of the segment rings 1, 20 can, with the cylinder wall 21, produce forces that try to move the individual segment sections of the segment rings axially due to the existing play in such a way that due to such a tipping motion, the sealing arrangement of the packing seal 10' may come apart. Using this securing device 40, the axial mobility of the segment rings 1, 20 of the packing seal 10' is limited. In this way, the danger of tipping can be substantially reduced. In particular the securing device 40 can move, dependent upon the working pressure, in such a way that the assembly gap and the axial play become smaller. For this purpose, the securing device 40 preferably comprises at least one element 40' which can move radially relative to the packing seal 10', in order to diminish the assembly gap axially. As can be seen in particular from FIG. 1 in the lower illustration, the securing device 40 can be designed wedge-shaped, whereby the wedge angle points toward the piston axis of the piston 22.

As illustrated, the securing device 40 can be designed annular. If necessary, it may also be divided into segments. Of course, other forms of construction of a securing device 40 and related elements 40' are possible, as long as these devices and elements functionally achieve the goal of diminishing the assembly gap axially. For example, wire bodies, wire form bodies, combinations thereof or equivalent elements come under consideration.

The securing device 40 as well as the related element 40' are furthermore designed in such a way that the securing device's 40 bearing surface facing the packing seal 10' is reduced for axial relief of pressure. To reduce the surface, surface interruptions, recesses, relief grooves 41 or the like can be provided.

The securing device 40 is at the same time usefully designed in such a way that the radially directed effective pressure on the packing seal 10' in the groove base 33 is reduced, which is achieved in particular in connection with the corresponding design of the relief groove 41, in that the flow rate to the groove base 33 is reduced with the help of the securing device 40.

Of course, the invention is not limited to the aforementioned preferred forms of construction but, rather, numerous changes and modifications are possible that the expert will make where necessary, without leaving behind the object of the invention.

Reference Number List 1 segment ring
2 bearing spring element

| 3 | sealing segment |
| 4 | locking segment |
| 8 | bore ⎞ |
| 9 | adjusting pin ⎠ torsion protection |
| 10 | packing seal in Fig. 2 overall |
| 10' | packing seal in Fig. 1 overall |
| 19 | torsion protection in Fig. 1 overall |
| 20 | segment ring |
| 21 | cylinder wall |
| 22 | piston |
| 23 | sealing segment of the segment ring 20 |
| 24 | locking segment of the segment ring 20 |
| 28 | bore |
| 29 | recess |
| 30 | adjusting pin |
| 31 | circumferential groove |
| 32 | working space |
| 33 | groove base |
| 40 | securing device overall |
| 40' | axially movable element of the securing device 40 |
| 41 | relief groove (recess) |

What is claimed is:

1. A packing seal, for reciprocating piston engines having a piston, the packing seal being placeable into a circumferential groove (31) of said piston (22), the packing seal comprising at least two axially adjacent segment rings (1, 20) that each have at least two sealing segments (3, 23) and, to avoid an abutting of the sealing segments, locking segments (4, 24), the locking segments arranged between the sealing segments in alternating order, the sealing segments (3) and the locking segments (4) of at least a first segment ring (1) taper wedge-shaped in opposite directions radially inward and outward, respectively, the locking segments (4, 24) are set back radially relative to the sealing area of the sealing segments (3; 23), the packing seal furthermore has a torsion protection (19) acting between the at least two segment rings (1, 20), wherein the improvement comprises alternating locking and sealing segments (24, 23) of at least one additional segment ring (20) both tapering radially inward, with the locking segments (24) extending over a substantially larger arc area that the sealing segments (23), and that the sealing segments (23) of the additional segment ring (20) overlay the lock elements (4) of the axially adjacent first segment ring (1) of the packing seal (10').

2. A packing seal according to claim 1, wherein the torsion protection (19) produces an interaction bond with at least one locking segment (24) of the additional segment ring (20) and one sealing segment (3) of the first segment ring (1).

3. A packing seal according to claim 2, wherein the torsion protection (19) comprises an adjusting element such as an adjusting pin (30) which runs through a bore (28) in the locking segment (24) of the additional segment ring and works together with a recess (29) on the sealing segment (3) of the axially adjacent first segment ring (1).

4. A packing seal according to claim 3, wherein the recess (29) originates from an inner circumference of the sealing segment (3).

5. A packing seal according to claim 1, wherein each segment ring (1; 20) comprises four locking segments (4; 24) and four sealing segments (3; 23), the taper angle of the locking elements (24) and the sealing elements (23) of the at least one additional segment ring (20) is roughly 45°.

6. A packing seal according to claim 2, the packing seal including a securing device (40) for the packing seal (10'), which limits in an axial direction a motion of the segment rings (1, 20) of the packing seal (10').

7. A packing seal according to claim 6, wherein the securing device (40) seeks to decrease in the axial direction, dependent upon working pressure, a gap between the packing seal (10') and the circumferential groove (31).

8. A packing seal according to claim 6, wherein the securing device (40) comprises at least one element (40') movable radially relative to the packing seal (10').

9. A packing seal according to claim 6, wherein the securing device (40) is designed wedge-shaped in the direction of the piston axis of the piston (22).

10. A packing seal according to claim 6, wherein the securing device (40) is designed annular and is preferably subdivided into segments.

11. A packing seal according to one of claims 6 through 10, wherein a support surface of the securing device facing the packing seal (10') is reduced for axially directed relief from pressure.

12. A packing seal according to claim 11, wherein the support surface of the securing device facing the packing seal (10') has surface interruptions such as recesses, relieves and grooves (41).

13. A packing seal according to claim 6, wherein the securing device (4) reduces the radially directed effective pressure on the packing seal (10') in a groove base (33) of a circumferential groove (31).

14. A packing seal according to claim 13, wherein the securing device (40) reduces flow cross-section to the groove base (33).

* * * * *